(12) United States Patent
Shiino et al.

(10) Patent No.: US 8,330,071 B2
(45) Date of Patent: Dec. 11, 2012

(54) DISCHARGING SURFACE PREPARATION METHOD AND REPAIRING METHOD

(75) Inventors: Masayoshi Shiino, Tokyo (JP); Hiroyuki Ochiai, Tokyo (JP); Shoju Masaki, Tokyo (JP); Mitsutoshi Watanabe, Tokyo (JP); Yukihiro Shimoda, Tokyo (JP)

(73) Assignee: IHI Corporation, Tokyo (JP)

( * ) Notice: Subject to any disclaimer, the term of this patent is extended or adjusted under 35 U.S.C. 154(b) by 615 days.

(21) Appl. No.: 12/593,702

(22) PCT Filed: Mar. 26, 2008

(86) PCT No.: PCT/JP2008/055784
§ 371 (c)(1),
(2), (4) Date: Sep. 29, 2009

(87) PCT Pub. No.: WO2008/120648
PCT Pub. Date: Oct. 9, 2008

(65) Prior Publication Data
US 2010/0126871 A1 May 27, 2010

(30) Foreign Application Priority Data
Mar. 30, 2007 (JP) ................. 2007-093685

(51) Int. Cl.
*B23K 26/00* (2006.01)
(52) U.S. Cl. .......... 219/121.64; 219/137 WM; 29/889.1

(58) Field of Classification Search ................. 29/889.1; 219/137 WM, 121.64
See application file for complete search history.

(56) References Cited

U.S. PATENT DOCUMENTS

| | | | |
|---|---|---|---|
| 2004/0031776 A1* | 2/2004 | Gevelber et al. | 219/121.36 |
| 2004/0112883 A1* | 6/2004 | Bowden et al. | 219/137 WM |
| 2005/0063827 A1* | 3/2005 | Ochiai et al. | 416/241 R |
| 2009/0200274 A1* | 8/2009 | Forster et al. | 219/69.15 |

FOREIGN PATENT DOCUMENTS

| | | |
|---|---|---|
| JP | 2006 63837 | 3/2006 |
| JP | 2006 249483 | 9/2006 |
| WO | 2004 033755 | 4/2004 |

* cited by examiner

*Primary Examiner* — Steven J Fulk
(74) *Attorney, Agent, or Firm* — Oblon, Spivak, McClelland, Maier & Neustadt, L.L.P.

(57) ABSTRACT

Generating pulsed discharge between an end surface of an electrode and an end face portion of a metallic plate, to attrite the electrode, to form in the end surface of the electrode a recess conforming to a shape of the end face portion of the metallic plate, having the electrode making a relative movement in a direction perpendicular to a lateral side of the metallic plate, generating pulsed discharge between an internal side face of the electrode recess and a lateral face of the end face portion of the metallic plate, to form an auxiliary coat on the lateral face of the end face portion of the metallic plate, and generating pulsed discharge between a bottom face of the electrode recess and a top face of the end face portion of the metallic plate, to form a cladding layer on the end face portion of the metallic plate.

14 Claims, 6 Drawing Sheets

DISCHARGING SURFACE PREPARATION METHOD AND REPAIRING METHOD

TECHNICAL FIELD

The present invention relates to a discharging surface preparation method of forming a coat or cladding layer on an end face portion of a metallic plate extremely narrow in width by using discharge energy, and a repairing method of repairing a worn end face portion of a metallic plate extremely narrow in width in a component to be repaired.

BACKGROUND ARTS

There have been developments of various techniques of surface preparation methods of forming a coat or cladding layer on a surface of a metallic component by using discharge energy, involving active developments of recent discharging surface preparation methods making use of discharge energy.

Patent documents 1 and 2 have disclosed discharging surface preparation methods, including having a compact formed from powder of metal or the like, employed as an electrode, generating pulsed discharge between an end surface of the electrode and a surface of a metallic component, in a liquid or gas providing an electric insulation property. By this, they allow for using discharge energy of that, to deposit a material of the electrode or a reactant substance of the material on the surface of the metallic component, to form a coat or cladding layer.

Patent document 1: WO2006/095799
Patent document 2: WO2004/113587

DISCLOSURE OF THE INVENTION

However, in application of preparation to end face portions extremely narrow in width, such as at an end face portion of a metallic plate constituting a honeycomb cell of a sealing component in a gas turbine engine, there have been problems as follows:

Namely, generating pulsed discharge between an end surface of an electrode and an end face portion of a metallic plate had a molten pool formed in a top face of the metallic plate, and failed to form a clad or cladding layer on the top face of the metallic plate, if the top face of the metallic plate had a narrower width than a diameter of the molten pool.

Further, even if the top face of the metallic plate had a wider width than the diameter of the molten pool, there would have been an increase in amount of a material of the electrode or the like scattered, without being deposited on an end face portion of the metallic plate, adversely affecting a yield of the electrode.

It is an object of the present invention to provide a discharging surface preparation method and a repairing method employing the discharging surface preparation method, that can solve the problems described.

According to a first aspect of the present invention, a discharging surface preparation method of surface preparing an end face portion of a metallic plate extremely narrow in width by using discharge energy comprises a recess forming step of having a compact formed from at least one of powder of metal, powder of compound of metal, and powder of ceramics, employed as an electrode, generating pulsed discharge between an end surface of the electrode and the end face portion of the metallic plate, in a liquid or gas providing an electric insulation property, for using discharge energy thereof, to attrite the electrode, to form in the end surface of the electrode a recess conforming to a shape of the end face portion of the metallic plate, an auxiliary coat forming step of having, under a condition holding a prescribed discharge gap, the electrode making a relative movement in a direction perpendicular to a lateral side of the metallic plate, generating pulsed discharge between an internal side face of the recess of the electrode and a lateral face of the end face portion of the metallic plate, in a liquid or gas providing an electric insulation property, for using discharge energy thereof, to deposit a material of the electrode or a reactant substance thereof on the lateral face of the end face portion of the metallic plate, to form an auxiliary coat, and an end coating step of generating pulsed discharge between a bottom face of the recess of the electrode and a top face of the end face portion of the metallic plate, in a liquid or gas providing an electric insulation property, for using discharge energy thereof, to deposit a material of the electrode or a reactant substance thereof on the top face of the end face portion of the metallic plate, to form a cladding layer.

According to a second aspect of the present invention, a repairing method of repairing a worn end face portion of a metallic plate extremely narrow in width in a component to be repaired comprises a recess forming step of having a compact formed from at least one of powder of metal, powder of compound of metal, and powder of ceramics, employed as an electrode, generating pulsed discharge between an end surface of the electrode and the end face portion of the metallic plate, in a liquid or gas providing an electric insulation property, for using discharge energy thereof, to attrite the electrode, to form in the end surface of the electrode a recess conforming to a shape of the end face portion of the metallic plate, an auxiliary coat forming step of having, under a condition holding a prescribed discharge gap, the electrode making a relative movement in a direction perpendicular to a lateral side of the metallic plate, generating pulsed discharge between an internal side face of the recess of the electrode and a lateral face of the end face portion of the metallic plate, in a liquid or gas providing an electric insulation property, for using discharge energy thereof to deposit a material of the electrode or a reactant substance thereof on the lateral face of the end face portion of the metallic plate, to form an auxiliary coat, and an end coating step of generating pulsed discharge between a bottom face of the recess of the electrode and a top face of the end face portion of the metallic plate, in a liquid or gas providing an electric insulation property, for using discharge energy thereof; to deposit a material of the electrode or a reactant substance thereof on the top face of the end face portion of the metallic plate, to form a cladding layer.

BEST MODE FOR CARRYING OUT THE INVENTION

There will be described in order a sealing component as a component to be repaired, a discharging preparation machine used for execution of a repairing method according to an embodiment of the present invention, and the repairing method according to the embodiment of the present invention, with reference to FIGS. 1 to 6.

Figure 3:
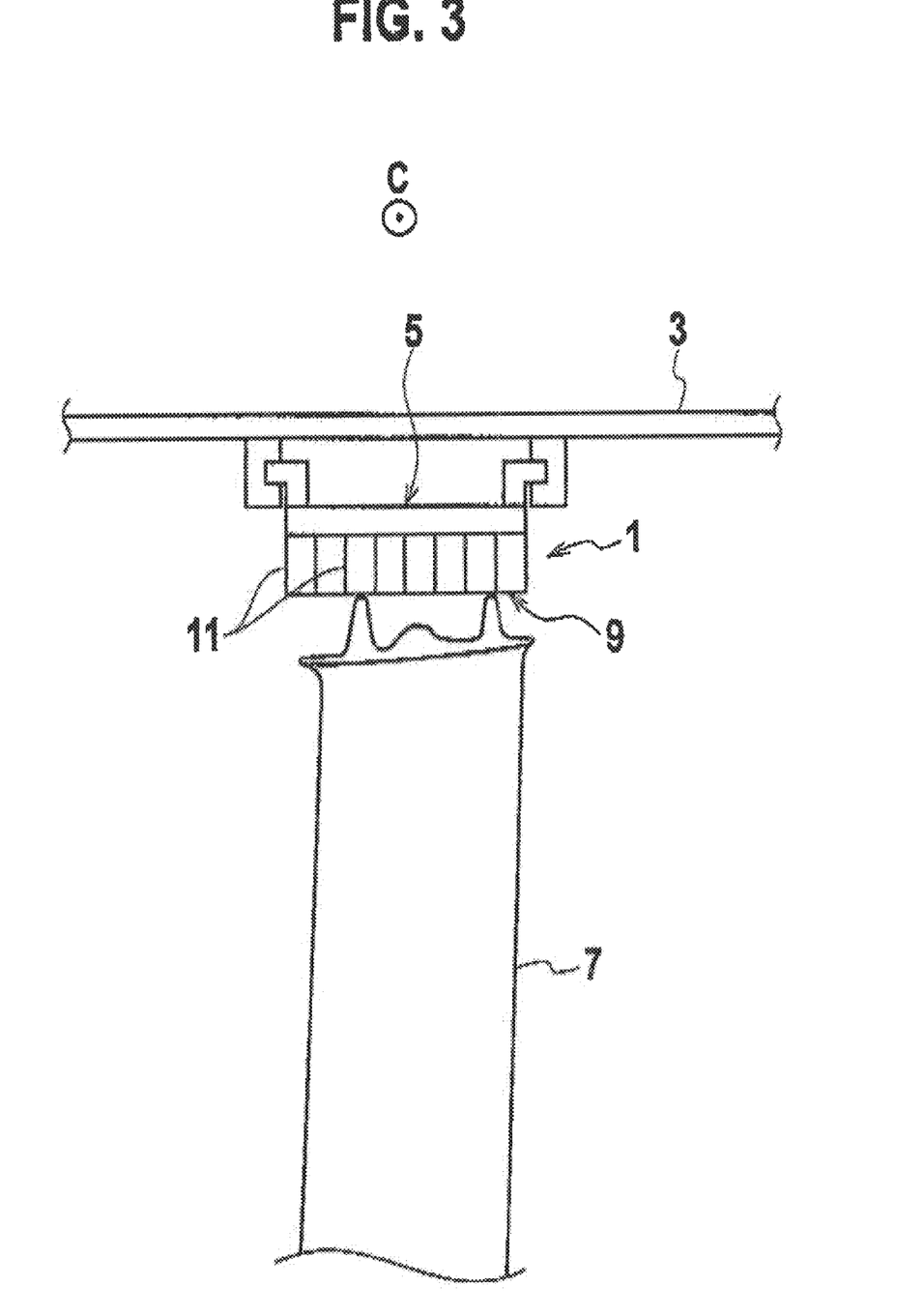
FIG. 3 is a view for illustration of a periphery of a sealing component as a member to be repaired.
Figure 4:
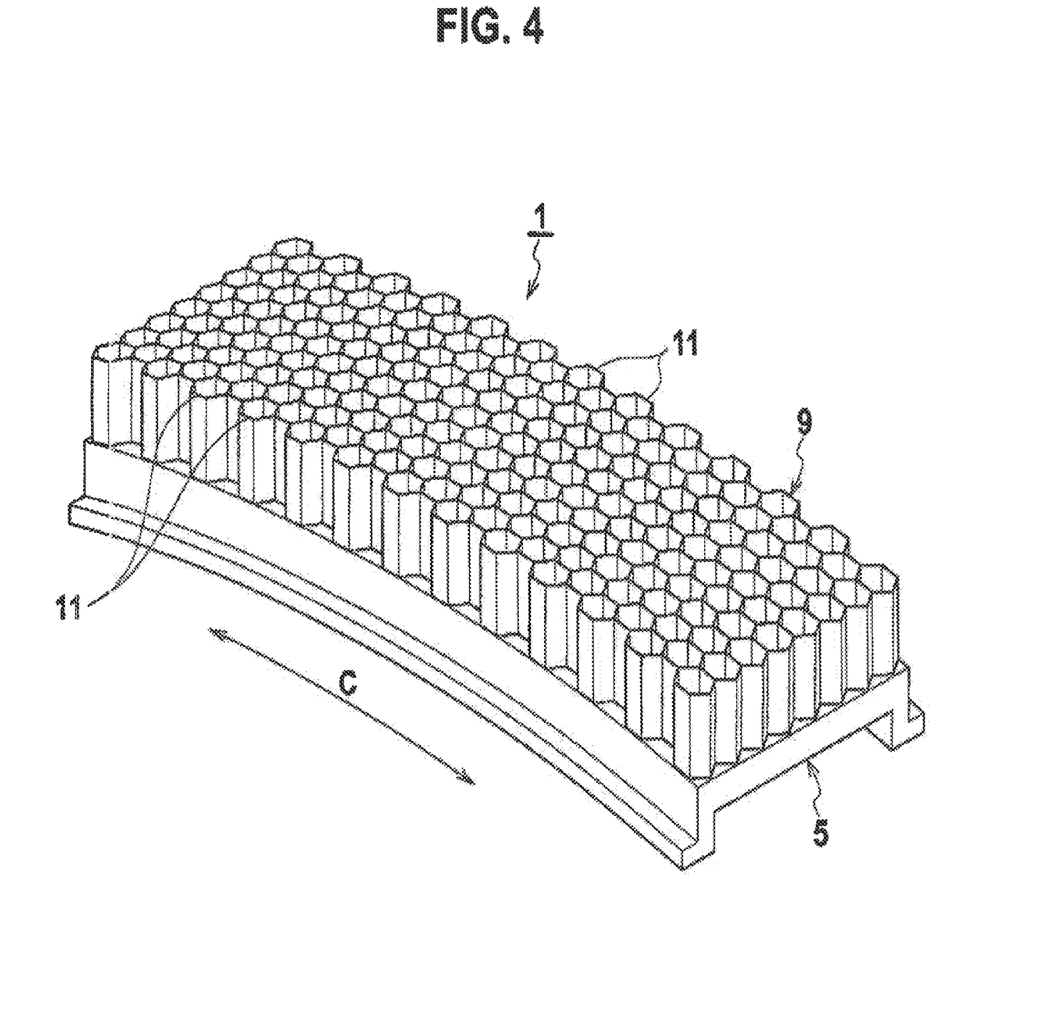
FIG. 4 is a perspective view of the sealing component.
Figure 5:
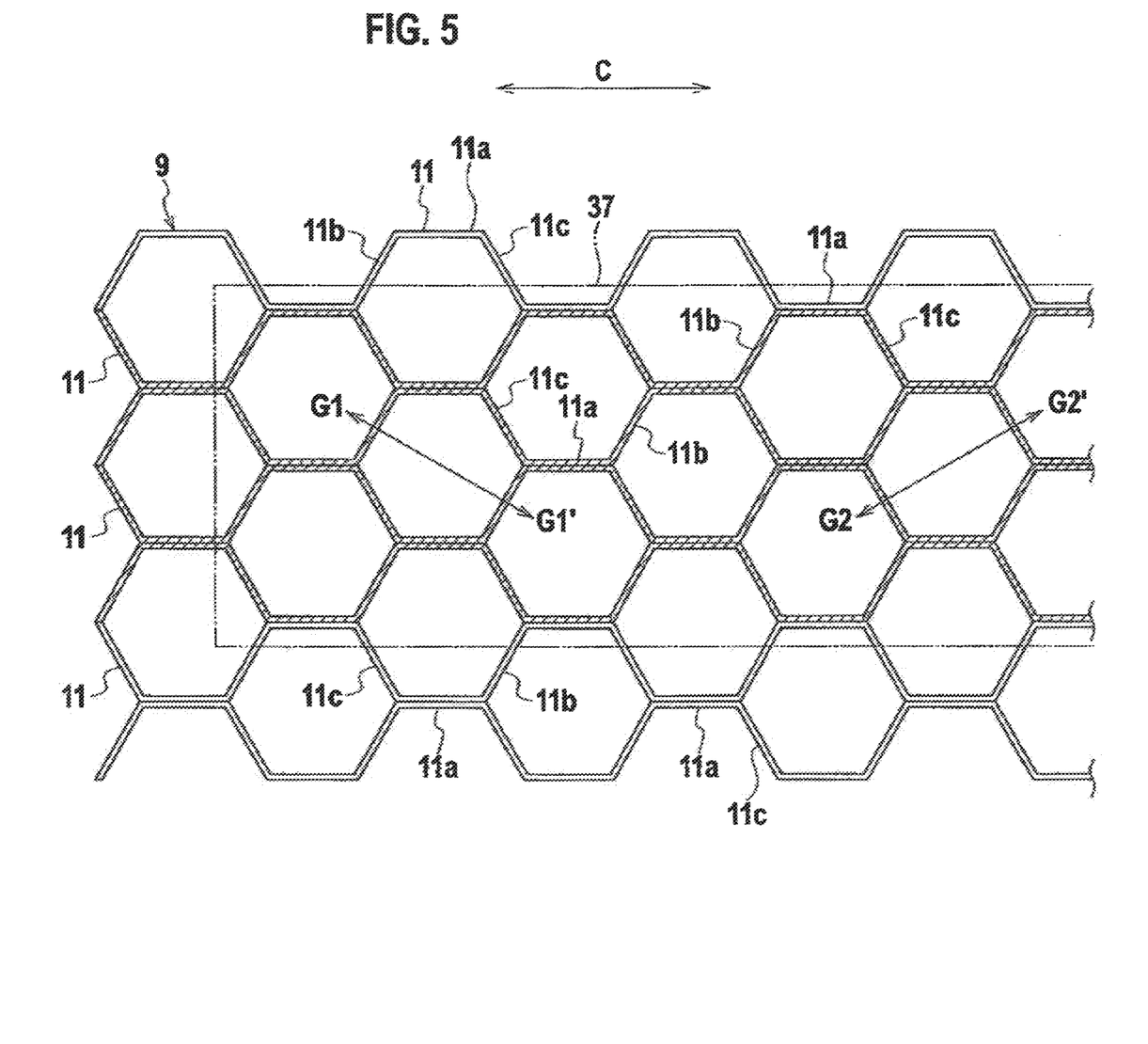
FIG. 5 is an enlarged view of a honeycomb cell of the sealing component.

As illustrated in FIG. 3, the sealing component 1 as a component to be repaired is employed in a gas turbine engine such as a jet engine, and includes an arcuate backup plate 5 fixed to an engine case 3 of the gas turbine engine, and a honeycomb cell 9 integrally provided to the backup plate 5, permitting a contact with turbine rotor blades 7. Further, as illustrated in FIG. 4 and FIG. 5, the honeycomb cell 9 is made up by a plurality of metallic plates 11 extremely narrow in width, the metallic plates 11 each respectively having a plurality of parallel portions 11a parallel to a circumferential direction C of the engine case 3, a plurality of first inclined parts 11b inclined to one side (toward a diagonally upper right end in FIG. 5) relative to the circumferential direction C of the engine case 3, and a plurality of second inclined parts 11c inclined to the other side (toward a diagonally upper left end in FIG. 5) relative to the circumferential direction C of the engine case 3. It is noted that in the honeycomb cell 9, the metallic plates 11 extremely narrow in width are worn at their hatched parts in FIG. 5.

Figure 6:
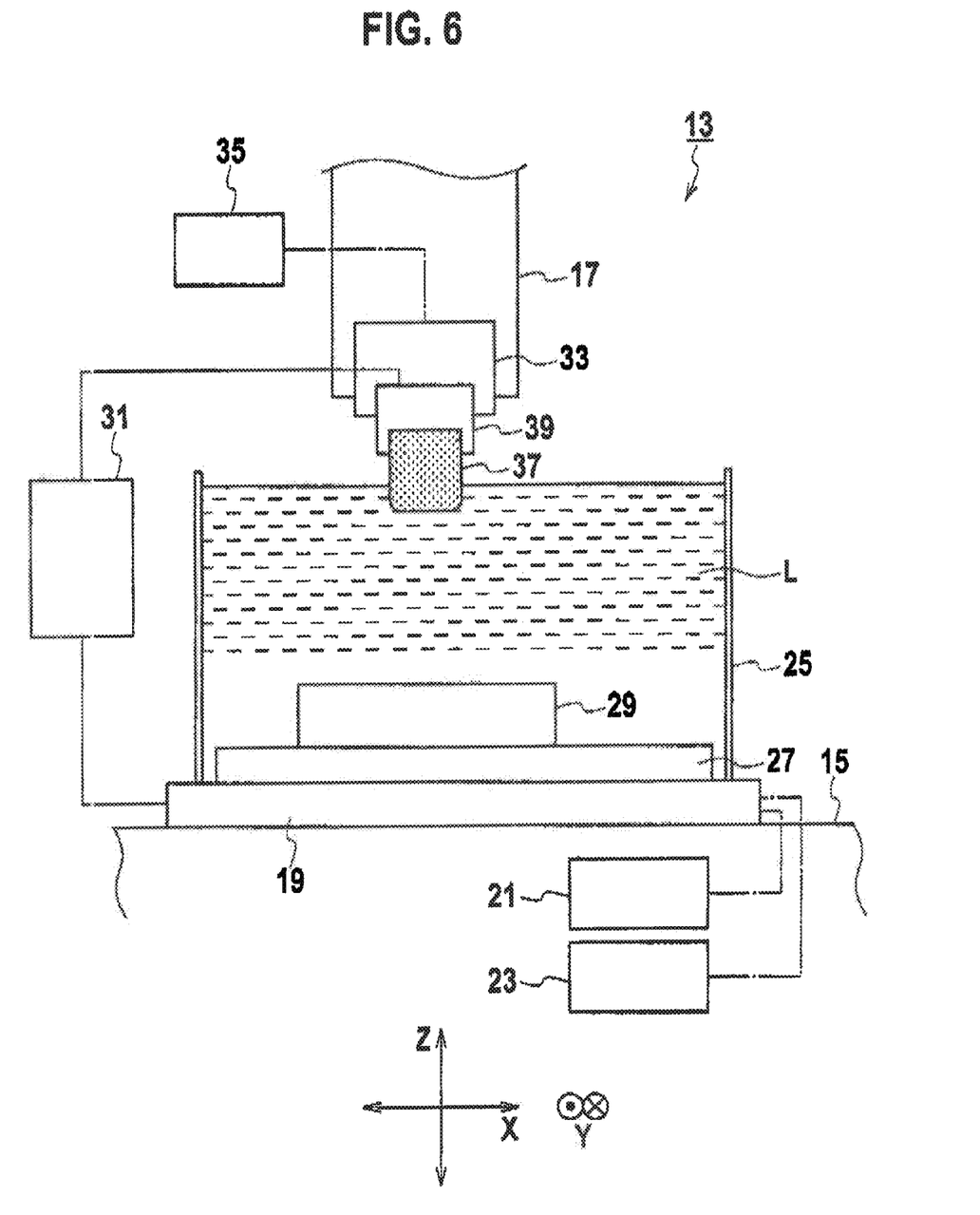
FIG. 6 is a diagram for illustration of a discharging preparation machine directly used for execution of the repairing method according to the embodiment of the present invention.

As illustrated in FIG. 6, the discharging preparation machine 13 used for execution of the repairing method according to the embodiment of the present invention includes a bed 15 extending in an X-axis direction and a Y-axis direction, the bed 15 being provided with a column 17 extending in a Z-axis direction. Further, the bed 15 is provided with a table 19. The table 19 is adapted to be driven by an X-axis servo motor 21 to move in the X-axis direction, and to be driven by a Y-axis servo motor 23 to move in the Y-axis direction.

The table 19 is provided with a preparation tank 25 configured for storage of a liquid L that provides an electric insulation property. The preparation tank 25 has a support plate 27 installed therein. The support plate 27 is provided with a jig 29 adapted to set the sealing component 1 thereon. The jig 29 is electrically connected to a power supply 31, through the support plate 27 and the like.

The column 17 has a preparation head 33. The preparation head 33 is adapted to be driven by a Z-axis servo motor 35 to move in the Z-axis direction. And, the preparation head 33 is provided with a holder 39 for holding an electrode 37, the holder 39 being electrically connected to the power supply 31. The electrode 37 used is now assumed to be a compact formed by compression of powder of a Co—Cr (cobalt-chrome) alloy (there may be a heat treated compact). It is noted that the electrode 37 may not be formed by compression, and instead, it may be formed by use of a slurry, MIM, spraying, etc.

Description is now made of the repairing method according to the embodiment of the present invention, assuming arrangements of the discharging preparation machine 13 and the sealing component 1 described.

Figure 1:
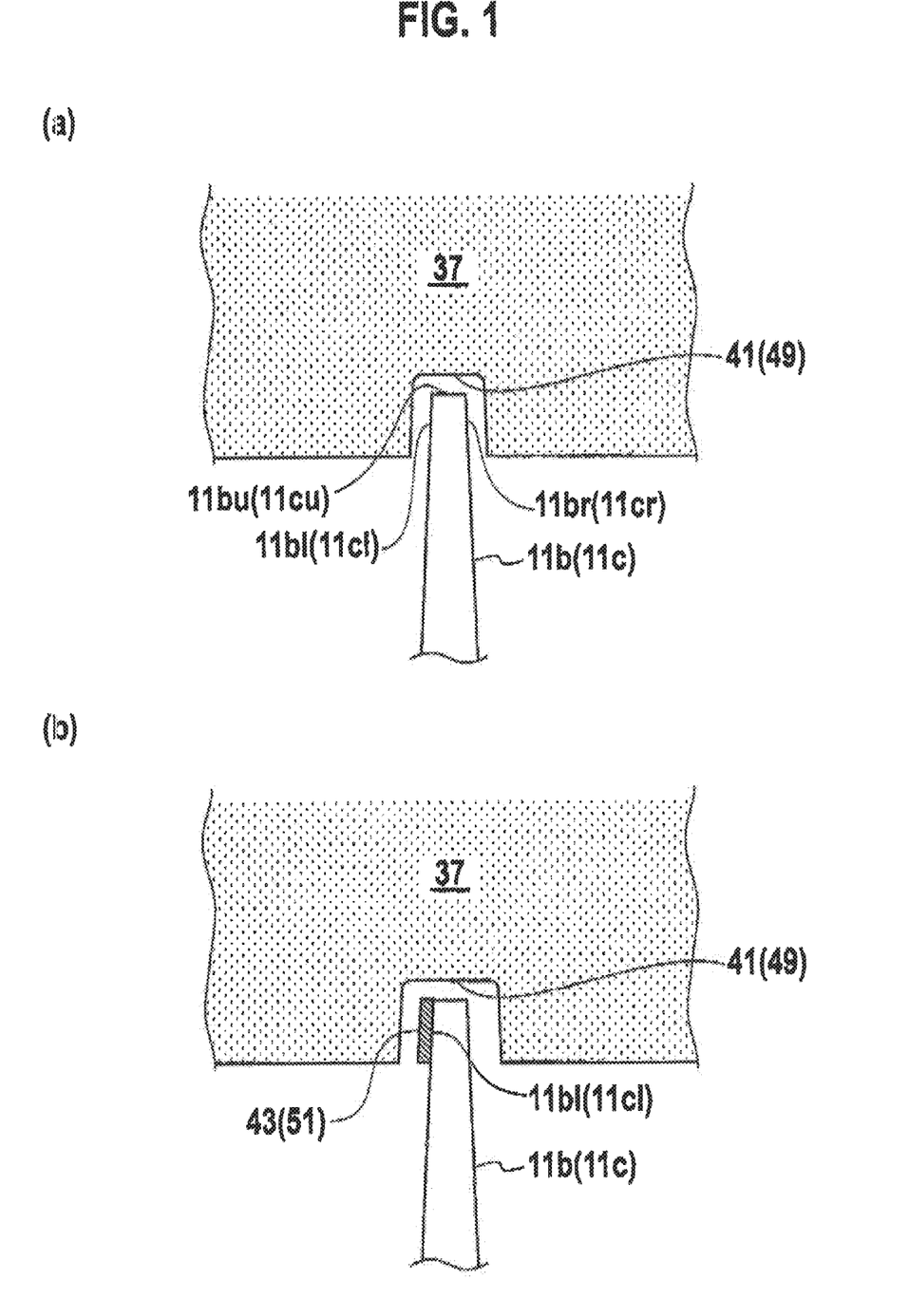
FIG. 1 is a view for description of a repairing method according to an embodiment of the present invention.

The repairing method according to the embodiment of the present invention is a method of repairing a worn end face portion of a metallic plate 11 extremely narrow in width (mainly at a first inclined part 11b or a second inclined part 11c of metallic plate 11) in the honeycomb cell 9, and includes a recess forming step, an auxiliary coat forming step, an end coating step, a repeating step, and a finishing step. Specific contents of the steps are as follows. It is noted that in this embodiment of the invention, as illustrated in FIG. 1(a), the end face portion of inclined part 11b (11c) of metallic plate 11 has a top face 11bu (11cu) and end lateral faces 11bl (11cl) and 11br (11cr). Further, in FIG. 11(a), the top face 11bu (11cu) of inclined part 11bl (11cl) of metallic plate 11 is worn, and has a width of 0.05 mm or less.

(Recess Forming Step)

The honeycomb cell 9 is positioned in place established as prescribed, by driving the X-axis servo motor 21 and/or the Y-axis servo motor 23 to move the table 19 in X-axis direction and/or Y-axis direction, under a condition with the sealing component 1 set to the jig 29. This is followed by generation of pulsed discharge between an end surface of the electrode 37 and an end face portion of the first inclined part 11b of metallic plate 11, in the liquid L providing an electric insulation property. This allows for, as illustrated in FIG. 1(a), using discharge energy of that, to attrite the electrode 37, to form in the end surface of the electrode 37 a recess 41 approximate to a shape at the side of the end face portion of the first inclined part of the metallic plate.

(Auxiliary Coat Forming Step)

As the recess forming step is completed, this is followed by control to drive the X-axis servo motor 21 and the Y-axis servo motor 23, thereby having, under a condition holding a prescribed discharge gap, the electrode 37 making a relative movement in a direction G1 (refer to FIG. 5) perpendicular to and approaching one lateral side of first inclined part 11b of the metallic plate, while generating pulsed discharge between an internal side face of the recess 41 of electrode 37 and a vicinity (an end lateral face 11bl) of the end face portion at the one lateral side of the first inclined part 11b of metallic plate 11, in the liquid L providing an electric insulation property. This allows for, as illustrated in FIG. 1(b), using discharge energy of that, to deposit a material of the electrode 37 or a reactant substance of the material on the end lateral face 11bl of the first inclined part 11b of metallic plate 11, to form a first auxiliary coat 43 thereon.

Figure 2:
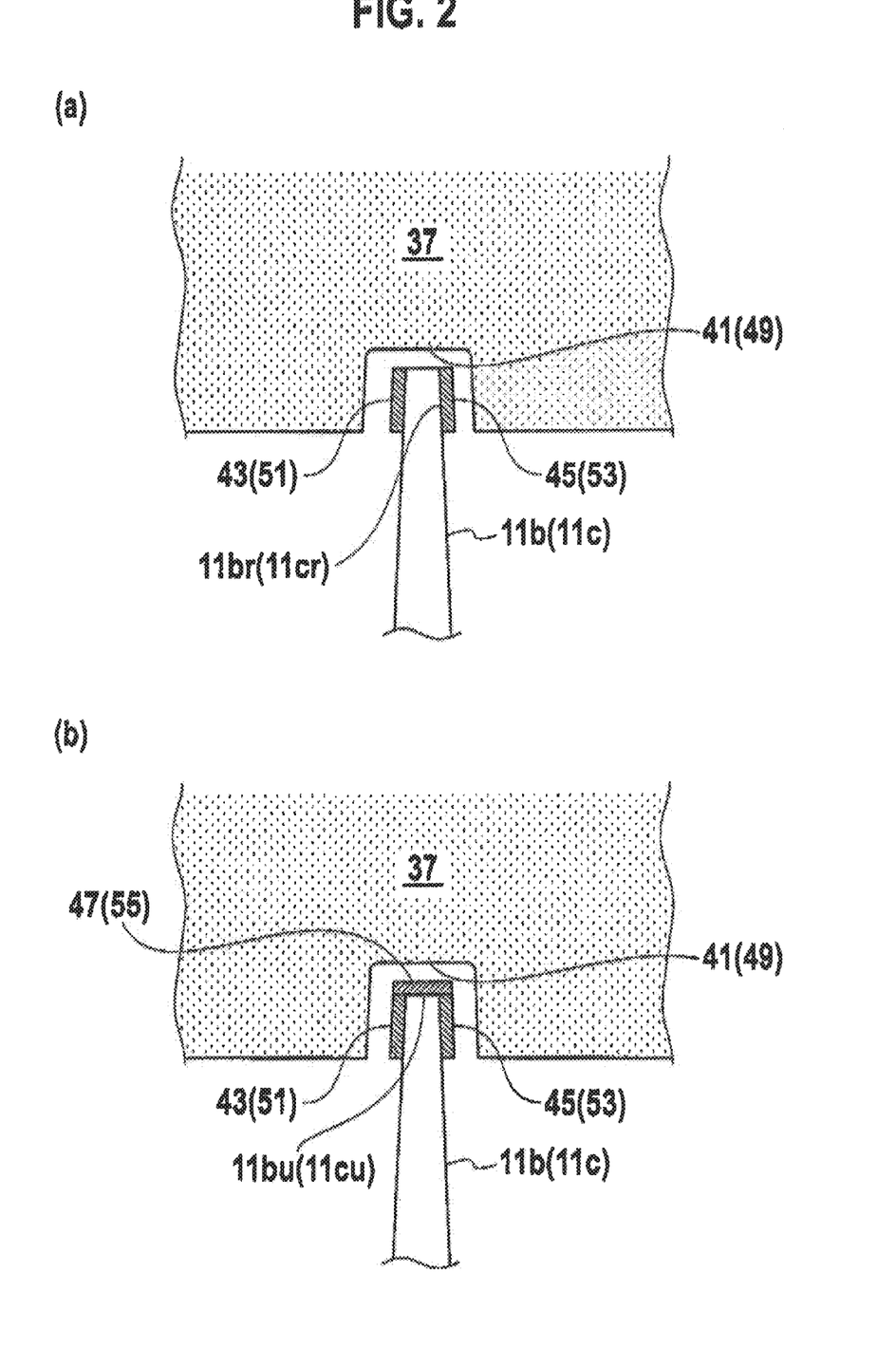
FIG. 2 is a view for description of the repairing method according to the embodiment of the present invention.

Further, this is followed by control to drive the X-axis servo motor 21 and the Y-axis servo motor 23, thereby having, under a condition holding a prescribed discharge gap, the electrode 37 making a relative movement in a direction G1' (refer to FIG. 5) perpendicular to and approaching another lateral side of the first inclined part 11b of metallic plate 11, while generating pulsed discharge between an internal side face of the recess 41 of electrode 37 and a vicinity of the end face portion at the other lateral side of the first inclined part 11b of metallic plate 11, in the liquid L providing an electric insulation property. This allows for, as illustrated in FIG. 2(a), using discharge energy of that, to deposit a material of the electrode 37 or the like in a vicinity (an end lateral face 11br) of the end face portion of the first inclined part 11b of metallic plate 11, to form a second auxiliary coat 45 thereon.

(End Coating Step)

As the auxiliary coat forming step is completed, this is followed by control to drive the Z-axis servo motor 35, thereby having the electrode 37 moving in the Z-axis direction, under a condition holding a prescribed discharge gap, generating pulsed discharge between a bottom face of the recess 41 of electrode 37 and a top face 11bu of the first inclined part 11b of metallic plate 11, in the liquid L providing an electric insulation property. This allows for, as illustrated in FIG. 2(b), using discharge energy of that, to deposit the electrode 37 or the like on the top face 11bu of the first inclined part 11b of metallic plate 11, to form a cladding layer 47 thereon.

It is noted that the forming the cladding layer 47 on the top face 11bu of the first inclined part 11b of metallic plate 11 is to be paralleled with depositing the electrode 37 or the like on also a top face of the parallel part 11a of metallic plate 11, thereby forming a cladding layer thereon (not shown).

(Repeating Steps)

As the end coating step is completed, this is followed by repeating a step sequence similar to that front the recess forming step to the end coating step, to thereby form a cladding layer 55 on a top face 11 cu of the second inclined part 11c of metallic plate 11.

In other words, there is implemented generation of pulsed discharge between an end surface of the electrode 37 and an end face portion of the second inclined part 11c of metallic plate 11, in the liquid L providing an electric insulation property, allowing for, as illustrated in FIG. 1(a), using discharge energy of that, to form in the end surface of the electrode 37 a recess 49 approximate to a shape at the side of the end face portion of the second inclined part 11c of metallic plate 11. This is followed in order by having, under conditions holding a prescribed discharge gap or prescribed discharge gaps, the electrode 37 making relative movements in directions G2 and G2' (refer to FIG. 5) perpendicular to and approaching lateral sides of the second inclined part 11c of metallic plate 11, while generating pulsed discharge between internal side faces of the recess 49 of electrode 37 and vicinities (end lateral faces 11cl and 11cr) of the end face portions at the lateral sides of the second inclined part 11c of metallic plate 11, in the liquid L providing an electric insulation property, allowing for, as illustrated in FIG. 1(b) and FIG. 2(a), using discharge energy of that, to deposit a material or materials of the electrode 37 or the like on the end lateral faces 11cl and 11cr of the second inclined part 110 of metallic plate 11, to form second auxiliary coats 51 and 53 thereon, respectively. Then, this is followed by having the electrode 37 moving in the Z-axis direction, generating pulsed discharge between a bottom face of the recess 49 of electrode 37 and a top face 11cu of the second inclined part 11c of metallic plate 11, in the liquid L providing an electric insulation property, allowing for, as illustrated in FIG. 2(b), using discharge energy of that, to deposit the electrode 37 or the like on the top face 11cu of the second inclined part 11c of metallic plate 11, to form a cladding layer 55 thereon.

It is noted that the forming the cladding layer 55 on the top face 11cu of the second inclined part 11c of metallic plate 11 is to be paralleled with depositing the electrode 37 or the like on also a top face of the parallel part 11a of metallic plate 11, thereby forming a cladding layer thereon.

(Finishing Step)

As the repeating steps is completed, this is followed by removing the sealing component 1 from the jig 29, to set to a grinding machine (not shown), in position as prescribed. Then, the grinding machine is operated as necessary for finishing a dimension of a length as a sum of a width of the metallic plate 11 and fractions of thickness of the cladding layer 47 (55) to be a prescribed length.

By the foregoing, the repairing is completed of worn end face portions of the metallic plate 11 extremely narrow in width.

There will be described behaviors and effects of this embodiment of the invention.

There is implementation of having, under conditions holding a prescribed discharge gap or prescribed discharge gaps, the electrode 37 making relative movements in directions perpendicular to and approaching lateral sides of the inclined part 11b (11c) of metallic plate 11, while using discharge energy, thereby depositing a material or materials of the electrode 37 or the like in vicinities (end lateral faces 11bl (11cl) and 11br (11cr)) of the end face portions at both lateral sides of the inclined part 11b (11c) of metallic plate 11, to form auxiliary coats 43 and 45 (51 and 53) thereon, respectively, thus allowing for the coating width (as the width to be coated) at an end side face of the inclined part 11b (11c) of metallic plate 11 to be expanded by fractions commensurate with thickness of the auxiliary coats 43 and 45 (51 and 53). It is noted that in this embodiment of the invention, the coating width at end side face of the inclined part 11b (11c) of metallic plate 11 is 0.10 mm or more.

Therefore, this embodiment of the invention allows, even if the width at end side face of the inclined part 11b (11c) of metallic plate 11 is narrower than a diameter of a molten pool due to discharge, for an ensured formation of a cladding layer 47 (55) on the top face 11bu (11cu) of the inclined part 11b (11c) of metallic plate 11, as well as for a decreased amount of a material of the electrode 37 or the like scattered, without being deposited on an end face portion of the inclined part 11b (11c) of metallic plate 11, with an enhanced yield of the electrode 37.

It is noted that the present invention is not restricted to the embodiment described above, and can be modified in a variety of manners, as exemplified below.

Namely, there may be an auxiliary coat formed simply on one of laterals sides at an end of a metallic plate. Moreover, the liquid L that has an electric insulation property may be substituted by a gas that has an electric insulation property, in order for pulsed discharge to be generated therein. Further, there may be a discharging surface preparation method of using discharge energy to form a coat or cladding layer on an end face portion of a metallic plate extremely narrow in width, employing the recess forming step, auxiliary film forming step, and end coating step described.

INDUSTRIAL APPLICABILITY

The present invention permits a metallic plate to have at a top face thereof a coating width expanded by a fraction commensurate with a thickness of an auxiliary coat, thus allowing, even if the top face of the metallic plate is narrower than a diameter of a molten pool, for an ensured formation of a coat or cladding layer on the top face of the metallic plate, as well as for a reduced amount of a material of an electrode or the like scattered, without being deposited on an end face portion of the metallic plate, with an enhanced yield of the electrode.

The invention claimed is:

1. A discharging surface preparation method of surface preparing an end face portion of a metallic plate extremely narrow in width by using discharge energy, the discharging surface preparation method comprising:

a recess forming step of having a compact formed from at least one of powder of metal, powder of compound of metal, and powder of ceramics, employed as an electrode, generating pulsed discharge between an end surface of the electrode and the end face portion of the metallic plate, in a liquid or gas providing an electric insulation property, for using discharge energy thereof, to attrite the electrode, to form in the end surface of the electrode a recess conforming to a shape of the end face portion of the metallic plate;

an auxiliary coat forming step of having, under a condition holding a prescribed discharge gap, the electrode making a relative movement in a direction perpendicular to a lateral side of the metallic plate, generating pulsed discharge between an internal side face of the recess of the electrode and a lateral face of the end face portion of the metallic plate, in a liquid or gas providing an electric insulation property, for using discharge energy thereof, to deposit a material of the electrode or a reactant substance thereof on the lateral face of the end face portion of the metallic plate, to form an auxiliary coat; and an end coating step of, following a completion of the auxiliary coat forming step, generating pulsed discharge between a bottom face of the recess of the electrode and a top face of the end face portion of the metallic plate, in a liquid or gas providing an electric insulation property, for using discharge energy thereof, to deposit a material of the electrode or a reactant substance thereof on the top face of the end face portion of the metallic plate, to form a cladding layer.

2. The discharging surface preparation method according to claim 1, wherein the auxiliary coat forming step comprises having, under a condition holding a prescribed discharge gap, the electrode making a relative movement in a direction perpendicular to a lateral side of the metallic plate, generating pulsed discharge between an internal side face of the recess of the electrode and one lateral face of the end face portion of the metallic plate, in a liquid or gas providing an electric insulation property, for using discharge energy thereof, to deposit a material of the electrode or a reactant substance thereof on the one lateral face of the end face portion of the metallic plate, to form a first auxiliary coat, and having, under a condition holding a prescribed discharge gap, the electrode making a relative movement in a direction perpendicular to another lateral side of the end face portion of the metallic plate, generating pulsed discharge between an internal side face of the recess of the electrode and another lateral face of the end face portion of the metallic plate, in a liquid or gas providing an electric insulation property, for using discharge energy thereof, to deposit a material of the electrode or a reactant substance thereof on the other lateral face of the end face portion of the metallic plate, to form a second auxiliary coat.

3. The discharging surface preparation method according to claim 1, wherein the metallic plate extremely narrow in width has a top face width less than or equal to 0.05 mm.

4. The discharging surface preparation method according to claim 1, wherein a coating width of the auxiliary coat on the lateral face of the end face portion of the metallic plate is 0.10 mm or more.

5. The discharging surface preparation method according to claim 1, wherein the auxiliary coat forming step is applied to only one lateral face of the end face portion of the metallic plate.

6. The discharging surface preparation method according to claim 1, wherein a plurality of the metallic plates form a honeycomb cell structure, integrated to an arcuate backup plate.

7. A repairing method of repairing a worn end face portion of a metallic plate extremely narrow in width in a component to be repaired, the repairing method comprising:

a recess forming step of having a compact formed from at least one of powder of metal, powder of compound of metal, and powder of ceramics, employed as an electrode, generating pulsed discharge between an end surface of the electrode and the end face portion of the metallic plate, in a liquid or gas providing an electric insulation property, for using discharge energy thereof, to attrite the electrode, to form in the end surface of the electrode a recess conforming to a shape of the end face portion of the metallic plate;

an auxiliary coat forming step of having, under a condition holding a prescribed discharge gap, the electrode making a relative movement in a direction perpendicular to a lateral side of the metallic plate, generating pulsed discharge between an internal side face of the recess of the electrode and a lateral face of the end face portion of the metallic plate, in a liquid or gas providing an electric insulation property, for using discharge energy thereof, to deposit a material of the electrode or a reactant substance thereof on the lateral face of the end face portion of the metallic plate, to form an auxiliary coat; and an end coating step of, following a completion of the auxiliary coat forming step, generating pulsed discharge between a bottom face of the recess of the electrode and a top face of the end face portion of the metallic plate, in a liquid or gas providing an electric insulation property, for using discharge energy thereof, to deposit a material of the electrode or a reactant substance thereof on the top face of the end face portion of the metallic plate, to form a cladding layer.

8. The repairing method according to claim 7, wherein the auxiliary coat forming step comprises having, under a condition holding a prescribed discharge gap, the electrode making a relative movement in a direction perpendicular to a lateral side of the metallic plate, generating pulsed discharge between an internal side face of the recess of the electrode and one lateral face of the end face portion of the metallic plate, in a liquid or gas providing an electric insulation property, for using discharge energy thereof, to deposit a material of the electrode or a reactant substance thereof on the one lateral face of the end face portion of the metallic plate, to form a first auxiliary coat, and having, under a condition holding a prescribed discharge gap, the electrode making a relative movement in a direction perpendicular to another lateral side of the metallic plate, generating pulsed discharge between an internal side face of the recess of the electrode and another lateral face of the end face portion of the metallic plate, in a liquid or gas providing an electric insulation property, for using discharge energy thereof, to deposit a material of the electrode or a reactant substance thereof on the other lateral face of the end face portion of the metallic plate, to form a second auxiliary coat.

9. The repairing method according to claim 7, comprising a finishing step of finishing a dimension of a thickness as a sum of widths by thickness of the cladding layer and a width of the metallic plate to be a prescribed thickness.

10. The repairing method according to claim 7, wherein the metallic plate extremely narrow in width in the component to be repaired comprises a metallic plate extremely narrow in width in a honeycomb cell of a sealing component employable in a gas turbine engine.

11. The repairing method according to claim 7, wherein the metallic plate extremely narrow in width has a top face width less than or equal to 0.05 mm.

12. The repairing method according to claim 7, wherein a coating width of the auxiliary coat on the lateral face of the end face portion of the metallic plate is 0.10 mm or more.

13. The repairing method according to claim 7, wherein the auxiliary coat forming step is applied to only one lateral face of the end face portion of the metallic plate.

14. The repairing method according to claim 7, wherein a plurality of the metallic plates form a honeycomb cell structure, integrated to an arcuate backup plate.

* * * * *